Patented Feb. 21, 1950

2,498,174

UNITED STATES PATENT OFFICE 2,498,174

ALUMINUM HEXACARBAMIDE PERIODIDE AS WATER DISINFECTANT

John Carrell Morris, Sudbury, Mass., assignor to the United States of America as represented by the Secretary of War No Drawing. Application July 7, 1945, Serial No. 603,745

2 Claims. (Cl. 167—22)

This invention relates to compositions of matter, and particularly compositions of matter suitable for the disinfection of water. More specifically, the invention is directed to compositions of matter, containing crystalline, water soluble periodides or polyiodides as an active ingredient, compounded in pill or tablet form for the disinfection of water supplies in relatively small quantities.

It has been known for a long time that iodine, either in elemental or triiodide ion form, is an effective bactericide. Recent investigation has shown that iodine is also effective against the cysts of *Entamoeba histolytica,* which, in general, are more resistant than pathogenic bacterial organisms. It has also been reported that, with proper dosage of iodine, disinfection of water polluted with bacteria, protozoa, worms, viruses and other similar disease-producing organisms, will occur in approximately ten minutes, without excessively affecting the palatability of the water.

The customary form of administration of iodine to water for disinfecting purposes has been to add a few drops of a solution containing iodine in an appropriate solvent, such as alcohol. The use of pure, solid iodine or solutions thereof, however, is impractical for two reasons, to wit: (1) its rate of solubility in water is very slow, and (2) its vapor pressure is so high that it is rapidly dissipated in the air if left exposed. Attempts have been made to overcome these difficulties by mechanically grinding and mixing the iodine with a suitable restraining material, which serves to decrease the vapor pressure of the iodine and at the same time render it more soluble. Although this method has been fairly satisfactory, it leaves much to be desired in effecting a high iodine stability and solubility.

It is desired that some composition of matter be effected containing releasable iodine, that is stable, has a high solubility in water, and low vapor pressure. It has been discovered that such a composition of matter containing a crystalline polyiodide, periodide, or triiodide, is an effective agent for disinfecting polluted water, and it is free of the objections stated above with respect to the use of elemental iodine.

In solution, the iodide ion will combine with elemental iodine to give the triiodide ion, and also the higher polyiodide ions, according to the reversible equations:

$$I^- + I_2 \rightleftharpoons I_3^-$$

and $$I^- + nI_2 \rightleftharpoons I^-_{2n+1}$$

where $n$ may be an integer from 1 to 4 inclusive. This results in a greatly increased solubility of iodine in iodide solutions. Crystalline salts may be prepared from the resulting triiodide and polyiodide ions, particularly with the elements rubidium and cesium, and ammonium and substituted ammonium ions. Such crystalline salts release the triiodide ion, or polyiodide ion as the case may be, directly when dissolved in water. It is not known whether the triiodide, or polyiodide ions disinfect water of their own accord, or whether they dissociate rapidly at the concentrations used to give elemental iodine, which accomplishes the disinfection. It is known, however, that the desired result is accomplished by employing these materials as water disinfecting agents.

It has been found that, for the series potassium triiodide, rubidium triiodide and cesium triiodide, the stability of the triiodides varies directly with the molecular weight of the cation radical with which the triiodide is associated. Consequently, to achieve the desirable characteristic of a very low dissociation pressure of iodine, one should choose a triiodide, periodide, or polyiodide with the largest cation conveniently possible. Such a large cation may be obtained in several ways, for instance by employing as cation a substitute ammonium salt of the type:

$$NR_1R_2R_3R_4^+$$

where $R_1$, $R_2$, $R_3$ and $R_4$ each may be a member selected from the group consisting of alkyl, aryl, aralkyl, substituted alkyl, substituted aryl, and hydrogen. The greatest stability, generally, is obtained when two or more of $R_1$, $R_2$, $R_3$ and $R_4$ are other than hydrogen. It is also preferable that the alkyl and substituted alkyl radicals contain less than five carbon atoms; and, that the aryl and substituted aryl radicals be of the benzene series. Another suitable larger cation is the complex metallic radical of the Werner types such as:

(1) $$M(NH_3)_6^{++}$$

where M is a metal selected from the group consisting of nickel, magnesium and calcium;

(2) $$M(NH_3)_4^{++}$$

where M is a metal selected from the group consisting of zinc and copper; and, (3) $$M(NH_3)_6^{+++}$$

where M is a metal selected from the group consisting of iron, cobalt, aluminum and chromium. The ammonia may be substituted in whole or in part by other neutral molecules or negatively charged atoms or radicals which have lone electron pairs capable of acting as donors in forming coordinate bonds.

Unfortunately, however, such achievement of stability by increase in the size of the cation if carried too far is generally accompanied by a decrease in solubility in water to such an extent that the product is not useful as a disinfectant for water supplies. Actually, it can be shown thermodynamically that if the process of solution of such a compound is a separation into cation and triodide ion, as is normally the case, then the stability of the compound and its solubility in water are inversely related. Satisfactory stability can be obtained, however, without too great a loss in solubility, so that those compounds which are considered as useful for the present purposes have vapor pressures of iodine less than 0.02 of that of elemental iodine at the same temperature, the measurements being made at room temperature, and solubilities in excess of 0.1 gram per liter of water.

In addition, the combination of high stability and high solubility may be attained by the use of a cation which is further decomposed into simpler particles by contact with water, in which case the previous relation between solubility and stability does not hold. This is the case with the specific compounds $Al(CON_2H_4)_6I_3 \cdot 3I_2$, $$Al(CON_2H_4)_6SO_4I \cdot I_2$$

and $Al(CON_2H_4)_6(NO_3)_2I \cdot I_2$, which are a part of this application and fall into the third group of the Werner type described above.

The relative stability of the triiodides is determined in the following fashion. An excess quantity of the solid, crystalline triiodide is shaken with pure, dry carbon tetrachloride for a number of days and titrations of the concentration of iodine dissolved are determined at daily intervals until they reach a constant value. Since the ionic salt does not itself dissolve in carbon tetrachloride, the titrated iodine can come only from the decomposition of the compound, and, at equilibrium the solid compound, the dissolved iodine and the iodine vapor are all equilibrated. If Henry's law be assumed to hold for solutions of iodine in carbon tetrachloride, then the vapor pressure of iodine from the compound relative to that of elemental iodine may be obtained by dividing the concentration of iodine in carbon tetrachloride, obtained by shaking the compound with that liquid by the concentration of iodine in a saturated solution of elemental iodine in carbon tetrachloride.

The preferred active ingredients are the following substances: trimethylammonium triiodide, tetramethylammonium triiodide, morpholine hydroperiodide, triglycine hydroperiodide, aluminum hexacarbamide triperiodide, aluminum hexacarbamide sulfate monoperiodide, aluminum hexacarbamide dinitrate monoperiodide, but other compounds of the class described and possessing the specifications outlined are not excluded.

In general, the method of preparation of these compounds calls for mixing some salt of the cation, for example the chloride, nitrate or sulfate, in concentrated water solution with a concentrated water solution of potassium triiodide, sodium triiodide or hydrogen triiodide, warming if necessary to complete solution, and allowing the desired product to crystallize on cooling, preferably to 0° centigrade. The product is then filtered off, dried and ground to a sufficient degree of fineness to assure rapid solution. Specific methods of preparation for some of the substances listed are given in the examples below.

EXAMPLE I

*Aluminum hexacarbamide dinitrate periodide.*—Seventy-two grams of carbamide is mixed with 37.5 grams of aluminum nitrate enneahydrate and the mixture is dissolved in 42.5 ml. of water by warming. In another vessel 16.5 grams of sodium iodide is mixed with 28.0 grams of iodine and the mixture is dissolved in 7.5 ml. of water. The former solution is poured while warm into the latter and allowed to cool to room temperature or below. The separated crystals are filtered and dried. The proportions of the various substances may be varied somewhat, but a substantial molecular excess of carbamide is necessary and a minimum volume of water is desirable. The slight excess of sodium iodide and iodine is not necessary, but gives a product of more nearly the theoretical composition. The yield of product is about 90%, based on the aluminum nitrate, and contains by analysis about 28.1% active iodine, compared with a theoretical active iodine content of 28.6%. This product is very stable, having a vapor pressure only 0.0005 of that of iodine at the same temperature. It has a solubility of 96 grams per liter, as measured by the amount of iodine released when a saturated solution is formed.

EXAMPLE II

*Aluminum hexacarbamide sulfate periodide.*—Seventy-two grams of carbamide crystals is mixed with 33.4 grams of aluminum sulfate octadekahydrate and dissolved by warming in 42.5 ml. of water. In another vessel 16.5 grams of sodium iodide and 28.0 grams of iodine are mixed and dissolved in 7.5 ml. of water. The former solution is poured while warm into the latter and allowed to cool to room temperature or below. The precipitated crystals are filtered and dried. The proportions of the various substances may be varied somewhat, but a substantial molecular excess of carbamide is necessary and a minimum volume of water is desirable. The slight excess of sodium iodide and iodine is not necessary, but gives a product of more nearly the theoretical composition. Potassium iodide or other soluble iodides may be substituted in equivalent amounts for the sodium iodide. The yield of product is about 90%, based on the aluminum sulfate, and contains by analysis 27.5% active iodine, compared with a theoretical active iodine content of 29.4%. This product is very stable, having a vapor pressure only 0.0015 that of iodine at the same temperature. It has a solubility of 140 grams per liter, as measured by the amount of iodine released when a saturated solution is formed.

EXAMPLE III

Triglycine hydroperiodide

*Method A.*—Forty-five grams of glycine and 16.7 ml. of concentrated HCl are mixed together with 50 ml. of water and the glycine is dissolved by warming. This solution is then added to a second solution made by dissolving 50.8 grams of iodine and 33.2 grams of potassium iodide in 30 ml. of water. The solution is then allowed to cool. Extensive crystallization begins almost at once. After cooling to 0° C. the precipitated crystals are filtered off and dried. The calculated percentage of active iodine for triglycine hydroperiodide is 41.8%. Analysis of this preparation gives 42.0%. The yield is about 75%. The vapor pressure of this compound is about 0.01 of that of iodine and its solubility in water is 140 grams per liter.

Method B.—50.8 grams of iodine is dissolved in a sufficient quantity of concentrated hydriodic acid to give 25.6 grams of hydrogen iodide. To this is added a solution of 45 grams of glycine dissolved by warming in 100 ml. of water. The solution is then allowed to cool and is finally chilled to 0° C. The precipitated crystals are filtered off and dried. The yield in this case is about 60 grams or 50%. It has an active iodine content of 40.5%.

EXAMPLE IV

Separate solutions of 80 grams of tetramethylammonium iodide in 1000 ml. of water and 100 grams of iodine plus 100 grams of potassium iodide in 1000 ml. of water are warmed to 80° C. and then the iodine solution is poured slowly into the tetramethylammonium iodide solution. Some precipitate forms immediately, the amount being considerably increased as the mixture is allowed to cool in an ice chest. The crystals are then filtered off with suction, washed with a little dilute potassium iodide solution and dried over sulfuric acid in a desiccator. The product is in the form of dark brown or black crystals with a bronzy luster and melts at about 127° C. This product is very stable, giving a vapor pressure only 0.003 times that of iodine and has a solubility of approximately 0.15 gram per liter.

EXAMPLE V

Thirty ml. of morpholine is diluted with distilled water to 100 ml. In another vessel 48 ml. of 55% HI, 84 grams of $I_2$ and 25 grams of KI are mixed and diluted to about 250 ml. The latter solution is poured into the former with stirring. The first addition produces a voluminous orangered precipitate which is later replaced by a dark, crystalline precipitate as the addition continues. After the reagents have been completely mixed and stirred thoroughly, the resulting mixture is placed in the ice-chest for 24 hours. It is then filtered with suction and dried. The product is in the form of dark, greenish-black crystals, melting point 119° C.

These materials are preferably compounded in powder, pill, or tablet form, with the addition of one or more of the following: a suitable binder, carrier, acidifying agent and dispersing agent. The use of such agents, either as diluents to adjust the dose of iodine to the proper amount, or as swelling and dispersing materials to increase the rate of solubility of the crystals, or as acidifying materials to obtain a favorable pH in the water being treated does not change the fundamental principles of this invention. The use of NaI or of other iodides as added agents is known to increase the solubility of the polyiodides in water, but such addition is undesirable from a physiological viewpoint since it increases the iodine intake into the body.

Any non-toxic water-soluble, solid acid or acidic substance may be used as the carrier for the iodine compounds described above. Preferred examples which possess desirable binding and dispersing properties are di-sodium dihydrogen pyrophosphate, mono-sodium dihydrogen phosphate, citric acid, tartaric acid, etc. In addition to the carrier a small amount of lubricant such as talc is also ordinarily employed. The following examples are illustrative.

(a)
368 grams $Al(CON_2H_4)_6SO_4.I.I_2$
1104 grams $Na_2H_2P_2O_7$
44.6 grams talc
(b)
388 grams triglycine hydroperiodide
1937 grams $Na_2H_2P_2O_7$
77 grams talc The ingredients in the above examples are thoroughly mixed and ordinarily should be of such size as to pass readily through a 20 mesh sieve. Tableting of the mixed ingredients may be carried out in accordance with standard procedures. In the above examples tablets are usually of the 110–120 mg. type satisfactory for use in the disinfection of one liter of water. Their iodine content is such as to liberate about 8 mg. of elemental iodine. Ordinarily the free iodine (after reaction with any organic matter present) should range from about 5 to 20 P. P. M. Below 5 P. P. M. disinfection is not of the type desired while 20 P. P. M. and higher of free iodine results in a water which is not particularly palatable.

Having thus described my invention, what I claim as new and wish to secure by Letters Patent is:

1. A water-disinfecting composition of matter containing as an active ingredient a periodide of an aluminum hexacarbamide cation having a vapor pressure of iodide at room temperature less than 0.02 of that of elemental iodine and a solubility greater than 0.1 gram per liter of water at room temperature, together with a solid nontoxic, water-soluble, acidic material capable of releasing sterilizing iodine from the said periodide when the composition is added to water to be purified, and talc.

2. A water-disinfecting composition of matter containing as an active ingredient aluminum hexacarbamide sulfate monoperiodide, together with a solid, non-toxic, water-soluble acidic material capable of releasing sterilizing iodine from the periodide when the composition is added to water to be purified.

JOHN CARRELL MORRIS.

REFERENCES CITED

The following references are of record in the file of this patent:

UNITED STATES PATENTS

| Number | Name | Date |
|---|---|---|
| Re. 21,528 | Fish | Aug. 13, 1940 |
| 1,429,276 | Davis | Sept. 19, 1922 |
| 2,281,612 | Witte | May 5, 1942 |
| 2,290,710 | Rice | July 21, 1942 |
| 2,295,504 | Shelton | Sept. 8, 1942 |
| 2,385,394 | Witte | May 5, 1942 |

FOREIGN PATENTS

| Number | Country | Date |
|---|---|---|
| 102,469 | Australia | Nov. 25, 1937 |

OTHER REFERENCES

Beilstein, Handbuch der Organischen Chemie, 4th ed., (1929), Berlin, J. Springer, page 26, vol. III.

Frost, J. Am. Chem. Soc., vol. 64, No. 6, pages 1286–1287. (Copy in POSL.)

Fair, Interim Report No. 2, July 1, 1944, OEMcmr–251 (restricted) to Committee Med. Research OSRD. (Copy in Division 43.)